United States Patent
Siemers et al.

(10) Patent No.: US 10,428,852 B2
(45) Date of Patent: Oct. 1, 2019

(54) STRIP OF NAILS MADE OF WOODY PLANT MATERIAL

(71) Applicant: Raimund Beck KG, Mauerkirchen (AT)

(72) Inventors: Stefan Siemers, Burghausen (DE); Hans Korte, Wismar (DE)

(73) Assignee: Raimund Beck KG, Mauerkirchen (AT)

( * ) Notice: Subject to any disclaimer, the term of this patent is extended or adjusted under 35 U.S.C. 154(b) by 400 days.

(21) Appl. No.: 15/315,632

(22) PCT Filed: May 11, 2016

(86) PCT No.: PCT/EP2016/060603
§ 371 (c)(1),
(2) Date: Dec. 1, 2016

(87) PCT Pub. No.: WO2016/180900
PCT Pub. Date: Nov. 17, 2016

(65) Prior Publication Data
US 2017/0191518 A1    Jul. 6, 2017

(30) Foreign Application Priority Data

May 11, 2015   (DE) ......................... 10 2015 107 371

(51) Int. Cl.
*F16B 15/08*      (2006.01)
(52) U.S. Cl.
CPC .................. *F16B 15/08* (2013.01)
(58) Field of Classification Search
CPC ..................................... F16B 15/08
USPC ........................ 411/57, 443, 442, 498, 908
See application file for complete search history.

(56) References Cited

U.S. PATENT DOCUMENTS

| | | | |
|---|---|---|---|
| 3,915,299 | A | 10/1975 | Miyaoku |
| 5,547,325 | A | 8/1996 | Tucker et al. |
| 2006/0060263 | A1 | 3/2006 | Inoue |

FOREIGN PATENT DOCUMENTS

| | | |
|---|---|---|
| DE | 19620273 A1 | 11/1997 |
| EP | 2540781 A1 | 1/2013 |
| JP | 55179213 U1 | 6/1954 |
| JP | S4845056 U | 6/1973 |
| JP | 2004251405 A | 9/2004 |
| JP | 2011021690 A | 2/2011 |

(Continued)

OTHER PUBLICATIONS

Albers, Centers for Disease Control and Prevention, "First NIOSH Comic Helps Dispel Internet Myth", Jul. 16, 2013. http://blogs.cdc.gov/niosh-service-blog/2013/07/16/nail.gun-comic/.

(Continued)

*Primary Examiner* — Gary W Estremsky
(74) *Attorney, Agent, or Firm* — Berenato & White, LLC (57) ABSTRACT

A strip of nails for a nail driver has a number of nails connected to one another in order to connect at least two components and each nail has a nail shaft and a nail tip. The nails are made of wood and/or wooden materials and/or bamboo or materials containing palm tissue with a density greater than 0.65 g/cm3 and are connected to severable connecting means which are automatically sheared off when a nail is driven in. The nail tip is a conical round tip. The ratio of the length of the tip of the nail to the smallest thickness of the nail shaft is between 1.5 and 3, in particular between 1.5 and 2.5, and preferably between 1.8 and 2.1.

23 Claims, 5 Drawing Sheets

(56) References Cited

FOREIGN PATENT DOCUMENTS

| WO | WO1994020273 | 9/1994 |
|---|---|---|
| WO | 2004071729 A1 | 6/2006 |

OTHER PUBLICATIONS

Wikipedia.org, "Power-actuated tool", page last modified Mar. 31, 2016. https://en.wikipedia.org/wiki/Powder-actuated_tool.

STRIP OF NAILS MADE OF WOODY PLANT MATERIAL

CROSS-REFERENCE TO RELATED APPLICATIONS AND CLAIM TO PRIORITY

This application is a national stage application of International Application No. PCT/ EP2016/060603 filed May 11, 2016, which claims priority to German Patent Application No. 102015107371.4 filed May 11, 2015, the disclosures of which are incorporated herein by reference and to which priority is claimed.

FIELD OF THE INVENTION

The present invention relates to a strip of nails for a nail driver that has a number of nails connected to one another for connecting at least two components which each have a nail shaft and a nail tip provided on the end of the latter. Furthermore, the invention relates to a method of producing this type of strip of nails and to a method of connecting two components by means of this type of strip of nails.

BACKGROUND OF THE INVENTION

Nails are some of the oldest connecting means known in construction technology such as house building, ship building, armaments technology etc., mostly in connection with wood as a material. A basic distinction should be made between rigid and hard nails made of metal, mostly iron/steel, which are driven directly into wood by hammering, and wooden nails that require a bore hole in order to connect two or more components made of wood or other materials, such as e.g. leather, to one another. Without a bore hole the wooden structures are crushed and/or the wooden nails break and/or shatter when struck with the hammer.

Traditionally nails are driven into the material to be nailed with hammers. Generally, a number of hammer blows are required for this purpose, there being a risk of bending the nail if the head of the nail is not struck in the longitudinal extension of the nail shaft.

Since with increasing industrialisation production speed is becoming more and more important for financial reasons, tools have been developed with which nails can be driven into the components to be connected more quickly than with a handheld hammer. These include in particular nail drivers which can be equipped with different drive concepts, compressed air playing a prominent role. Pneumatic nail guns are generally operated at pressures of 5-6 bar. The thrust speed is on average approx. 46 m/s (http://blogs.cdc.gov/niosh-service-blog/2013/07/16/nail.gun-comic/). Alternatively, nails can also be driven in with propelling charges. Speeds of 96 m/s to 395 m/s can be set here (http://en/wikipedia/org/wiki/Powder-actuated_tool).

In order to increase processing speeds, nails are combined to form rigid or flexible strips of nails which, when applying nails, can be used for automatically reloading a new nail in the nail driver. In addition to many advantages, steel nails also have some disadvantages. Despite corrosion prevention measures, such as galvanising, steel nails have a tendency to rust under ad-verse conditions. This is particularly the case if acid conditions prevail in the material being nailed. This applies in particular to woods with a high tanning agent content (hardwoods such as oaks, Bangkirai, or softwoods such as pines, Douglas fir, larch, etc.) which, due to their longevity in outdoor areas, are used e.g. for facades or terraces. When weathered, undesirable dark to black discolouration occurs, e.g. drip projections on facades at the nailing points. It is possible to remedy this by using stainless steel types, but it is very expensive.

Another disadvantage of steel nails relates to their recycling. Nailed wood is generally not processed with wood processing tools because tool blades be-come blunt very quickly or may be destroyed if they strike steel nails. Wooden components that contain steel nails are therefore mostly reduced into particles using crushers and are cleansed of any steel and iron components by means of magnets in order to be used for the production of chipboard or for fuel.

In some applications the interaction of iron or metals with electromagnetic waves is also undesirable. Thus, components that contain metal cannot be treated with high-frequency electromagnetic waves, e.g. with microwaves. Metal-free nails that do not cause any discoloration, in particular when weathered, can be processed by wood processing machines without damaging the tools and are electromagnetically compatible, and so have an interesting market potential. As well as facade applications, e.g. temporary structures such as hoardings, shuttering etc. or packaging can be connected with metal-free nails, and after use can be broken down into their components for material recycling by machining tools (e.g. saws). In this connection it is known from JP9043171 and U.S. Pat. No. 5,547,325A to use nails made of reinforced plastic or glass fibre-reinforced high performance plastics.

However, the use of reinforced, in particular glass fibre-reinforced (high performance) plastics can also be associated with disadvantages. Thus, glass fibres are abrasive and blunt the blades of wood processing tools. Further-more, the production of glass fibres and (high performance) plastics is energy-intensive and so environmentally unfriendly. Since high performance plastics have up to now only been able to be obtained from fossil raw materials, in this respect too they have a large carbon footprint and so are to be considered to be negative from an environmental point of view. In addition, high performance plastics are very expensive in comparison to bulk plastics.

SUMMARY OF THE INVENTION

Therefore, the object of the invention is to devise a strip of nails by means of which in particular components made of wood can be connected, without there being any risk of discoloration caused by weathering, and the components can also be recycled without crushing or laborious removal of the nails. Furthermore, methods for the production of this type of strip of nails and for connecting two components by means of this type of strip of nails are to be specified.

This object is achieved with a strip of nails of the type specified at the start in that the nails are made of wood and/or wooden materials and/or bamboo or materials containing palm tissue with a density greater than 0.65 g/cm3 and are connected with severable connecting means which are automatically sheared off when a nail is driven in, that the nail tip is made in the form of a conical round tip, and that the ratio of the length of the tip of the nail to the smallest thickness of the nail shaft is between 1.5 and 3, in particular between 1.5 and 2.5, and preferably between 1.8 and 2.1.

Surprisingly, it has been shown that the nails designed according to the invention, that are made of hard woods or wooden materials or of materials structurally similar to wooden materials and have a defined round tip, can be nailed by means of nail drivers without pre-boring without the nails breaking, cracking or bending.

The hardwoods include deciduous woods with densities of 0.65 g/cm³ or more, such as e.g. copper beech (*Fagus sylvatica*), hornbeam (*Carpinus betulus*), maple (*Acer pseudoplatanus* or *A. platanoides*), preferably deciduous woods with densities greater than 0.85 g/cm³, such as e.g. lignum vitae (*Guaiacum* ssp.), pernambuc (*Caesalpinia echinata*), bangkirai (*Shorea* ssp.) or some types of rosewood (*Dalbergia* ssp, *Machaerium* ssp), particularly preferably deciduous woods with densities greater than 1.0 g/cm³, such as e.g. bongossi (*Lophira alata*).

Suitable wooden materials that can be produced without the addition of binding agents include compressed woods with densities greater than 0.65 g/cm³, in particular with densities greater than 0.85 g/cm³ and preferably with densities greater than 1.0 g/cm³. These can be produced, for example, according to WO94/20273 A.

Non-compressed veneer layer woods and plywoods made of types of wood with sufficient density (see above) are not suitable wooden materials that are produced with the addition of binding agents. The commercially available veneer layer woods with sufficient density include e.g. BauBuche made by Pollmeier Massivholz GmbH & Co.KG, Creuzburg with a density of 0.68 g/cm³. Plywoods with veneer layers of equal thickness—so-called multiplex boards—made of beech or birch with densities of ≥0.7 g/cm³, are offered by various manufacturers such as e.g. UPM Plywood, Lahti, Finland. The preferred wooden materials with portions of binding agent include compressed veneer layer woods, compressed laminated wood and plywoods, e.g. made of beech veneer with average to high compression with densities of 1.1 g/cm³ to 1.4 g/cm³, such as e.g. synthetic resin compressed wood according to DIN 7707.

Structurally very similar to the wooden materials are compressed and glued materials made of woody plant material, e.g. composed of monocotyledons that include, among others, tissue from palm and bamboo growth. Com-pressed bamboo products are known, for example, under the designation CoBAM (compressed Bamboo). CoBAM has densities of 0.95 to 1.25 g/cm³.

Wooden nails have particular properties in comparison to metal nails and plastic nails. First of all, they can be produced from the same material as the component into which they are to be nailed. For example, by compressing pine or larch wood to a density greater than 0.8 g/m³, wooden nails are produced with which pine or larch wood cladding panels can be nailed onto a coniferous wood substructure. Due to the consistency of the material one obtains a particularly homogeneous and natural-looking appearance. The nail then resembles a branch more than it does a foreign body made of metal. As the wood ages, it darkens due to UV radiation, and when exposed to the weather, as is e.g. wooden cladding, the wood turns grey. In contrast to metal, and in particular to steel nails, the colour of wooden nails changes as does that of its substrate. Undesirable colour reactions between iron and tanning agents which lead to black discolouration of wood do not occur.

Wooden nails in wood do not interfere either when working with tools. The combination of wooden nails and the component is therefore exceptionally well suited to material recycling. Also, if used for fuel, there is no necessity to separate out any contamination due to metal materials, and this saves on cost.

Furthermore, in contrast to metal and plastic nails, wooden nails are hygroscopic and may swell. In particular, compressed wood can form very high swelling pressures of up to 10 N/mm². This property is of particular significance. In order to increase the pull-out resistance, wooden nails are dried before use to wood humidities that are below the humidity of the components to be nailed. Construction timber that is used or that is to be used outdoors has e.g. humidities >15%. Therefore, wooden nails should be dried to at least 5%, preferably 10% and particularly preferably to 15% less wood humidity than that to which the components to be nailed are dried. After the nail has penetrated, the nail absorbs humidity from the environment until it has achieved humidity equilibrium, and swells in so doing. Due to the swelling the nail presses more strongly against the surrounding material, as a result of which friction and pull-out resistance are increased.

It is essential that the nails according to the invention have a conical round tip, i.e. a tip with a circular cross-section, the length of which is at least one and a half times as great as the smallest thickness of the nail shaft. With a circular shaft this smallest thickness corresponds to the diameter, with an oval shaft it corresponds to the smaller diameter, and with a polygonal cross-section it corresponds to the smallest distance between two points lying opposite one another relative to the shaft axis. Tests have shown that with nails with a round tip driven into wooden components according to the present invention, there is close contact between the nail and the wood matrix of the component. Only very few and very small ruptures are to be seen in the wood matrix. However, with nails with a partial or pyramidal tip, clear and numerous ruptures can be seen at the point of contact between the nail and the matrix. In addition, annual ring structures that are strongly angled in the direction of protection can be seen in the region of the entry channel.

Figure 5:
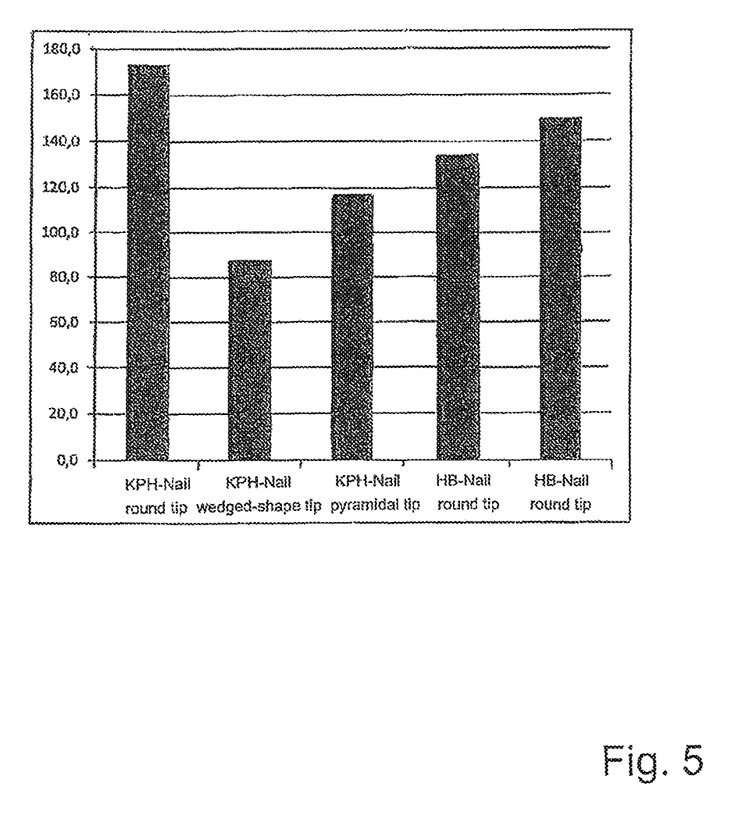

Furthermore, high pull-out resistance values can be achieved with the nails according to the invention which are provided with a round tip. In one test synthetic resin compressed wood nails (CW nails) with a round, wedge-shaped and pyramidal tip, with a density of 1.65 g/cm3 and solid wood nails made of hornbeam with a density of 0.8 g/cm3 and which were provided with a corresponding round tip, were driven 41 mm deep radially into spruce. Then the pull-out resistance was determined. The results are shown in FIG. 5. It can be gathered from this that the CW nails with a round tip, with an average value of 173.5 kp and top values of 199 kp achieved the highest pull-out force, followed by solid wood nails made of hornbeam (HB nails) with 149.9 kp (if one disregards the broken off nails) and a top value of 179 kp. In contrast, CW nails with a pyramidal tip achieved on average only 116.7 kp, and this corresponds to 67% of the average value of the CW nails with a round tip. CW nails with a wedge-shaped tip achieved on average only 87.9 kp, which in relation to CW nails with a round tip corresponds to 50.7%.

According to the invention it has been acknowledged that the geometry of the nail tip has a considerable influence upon the structure of the driving in channel in the transition from the nail to the matrix. It has been shown that when using round tips, the length of which corresponds to a range of 1.5 to three times the smallest shaft thickness, fibre ruptures along the drive-in channel of the nails can largely be avoided and the wood matrix rests tightly against the nail. Furthermore, nails that are driven in according to the present invention compress the cell structure along the drive-in channel and bend them in the direction of driving.

According to the invention two components are connected to one another by the nails formed according to the invention being driven into the components by means of a nail driver. Here the individual nails are driven into the components to be connected in one go by means of the nail driver at a speed of at least 20 m/s, in particular at least 25 m/s and preferably more than 30 m/s. When driving the nail into the substrate, due to the high driving-in speeds of pneumatic nail drivers which are generally over 20 m/s and often reach even more than 40 m/s, a high degree of friction is generated between the surface of the nail and the displaced substrate material. Frictional heat is generated by the friction. Since wood is a poor conductor of heat (coefficient of heat conductivity for wood being approx. 0.1 to 0.2 W/mK, for steel approx. 40-50 W/mK), the surfaces of the nail and of the driving channel in the surrounding material are heated up to such an extent here that fusing of the two materials occurs. This fusing effect has been described similarly in DE19620273 A. In contrast to DE19620273 A, when friction welding the nail that performs a frictional relative movement with respect to the surrounding material, no additional bearing pressure is applied, however, with which the tools are pressed against one another.

Due to the combination of frictional welding and swelling, the adhesion of the wooden nail in the (wooden) substrate is so high that one can dispense with the formation of a nail head projecting over the shaft diameter, as is typical for metal nails. This is very welcome for aesthetic reasons because in this way the visible nail diameter becomes smaller and the structure of the surface is interfered with less.

Preferably, the nails have a pull-out resistance of at least 80 kp (1 kilopond [kp] corresponds to 9.8 Newton [N]), preferably at least 90 kp and particularly preferably at least 100 kp. Alternatively or in addition, the nails can be coated at least partially with a polymer layer that contains a filling material and have a pull-out resistance of at least 90 kp, preferably at least 100 kp, and particularly preferably at least 110 kp.

Preferably the nails and connecting means are made of the same material, even if they can alternatively also be made of different materials.

The nail shaft can in principle have any cross-section. It can for example be made to be oval or polygonal. Preferably however, the nail shaft has a circular diameter. Preferably the diameter of the nail shaft or the smallest nail thickness if oval or polygonal is between 2 mm and 8 mm, in particular between 3.5 and 6 mm, and preferably between 4 and 5 mm.

According to a further development of the invention provision is made such that the nails have a nail head in the form of a half-lens-shaped cap that projects radially outwards over the shaft in relation to the shaft axis. Preferably however, the nail shaft is designed to be truncated smoothly at an angle of 90° in relation to the shaft axis at its end lying opposite the nail tip.

The length of the nail (head+shaft+tip) varies here between 20 mm and 90 mm, in particular between 30 mm and 70 mm, preferably between 40 mm and 60 mm.

In one embodiment of the invention the ratio of the axial nail length to the smallest shaft thickness with polygonal cross-sections is between 5 and 25, in particular between 9 and 20, and preferably between 12 and 16.

The nails are either produced individually or as a strip of nails composed of a row of nails arranged in parallel and which are connected to one another by connecting means. They can be produced here from a solid material using machining tools by punching, by cutting by means of electromagnetic waves, in particular by laser cutting, or by jet cutting, in particular by means of a jet of water or a particle-filled jet of gas, preferably by sand jetting or by a combination of these methods.

The strips of nails may differ according to different configurations, e.g. in strips in which nails and connecting means capable of shearing off are made of the same material or of different materials, strips of subsequently connected individual nails, strips of half nails that are assembled and connected by connecting means capable of shearing off, strips of nails that are produced by compression moulding and connected to one another by connecting means capable of shearing off, and strips of nails that are connected to one another by compression moulding.

Strips of nails are characterised by the arrangement of the individual nails. The width of the connecting means between two nails is defined by the distance between two nails. The width of the strip is determined by the sum of the products of the number of nails multiplied by the diameter and number of nails minus one multiplied by the distance between two nails. The tips of the nails arranged in parallel are located on a straight line that either runs at right angles to the orientation of the nails or at an angle α deviating from the right angle.

In a first step, strips made of the same material, such as e.g. of solid wood or wooden materials or CoBAM, are shaped to form a "corrugated board" by machining processes (planing or milling), which board has half-bars lying exactly opposite on both sides and which are connected laterally by a narrow bar. In a second step the "corrugated board" is cut transversely, possibly in a step-like manner, at a predetermined angle α, to form strips of bars lying in parallel, the length of which corresponds to the nail length that is provided. In order to shorten the length of the connecting means between the nails, and so to increase the shearing capability, recesses are cut into the bars by traditional machining methods such as sawing, drilling, milling or grinding, by punching or by methods such as cutting with electromagnetic waves (laser) or jet cutting (water jet, particle-filled gas jet (e.g. sand jet)) so that instead of the complete, continuous connecting elements, only narrow connecting elements remain that connect the bars to one another. In order to produce nails from the bars, the bars are sharpened on one side. If this has not yet taken place during the cutting of the strips, the heads are formed at right angles to the bar axis or in the shape of a cap by machining, punching, by laser beam or jet cutter.

The length of the connecting means, that is measured in the axis direction of the nails, in the total of the individual lengths of one or more connecting means between two nails, is less than half, preferably less than a third, and particularly preferably less than a quarter of the nail length.

In order to produce strips of nails from subsequently connected individual nails, the latter are laid next to one another in the desired arrangement, either at right angles to the nail axis or at an angle α to the latter, and are connected to one another by connecting means. These connecting means may be located only between the individual nails without any contact with the next connecting means. This formation may be produced e.g. with drops of adhesive. Alternatively, the connecting means can be continuously connected to one another. The connecting means can be, for example, in the form of one or more shearable strips or threads, of paper, plastic film, plastic fusible strips etc. which lie transversely over the individual nails and bridge the spaces be-tween the nails. The strips can be fastened to each individual nail here, e.g. by adhesive or by fusing. In the case of plastic fusible strips, the strip of nails can only be used when the fused material has solidified. In another embodiment of the invention the connecting means can be made in the form of a shearable strip, thread or wire with appropriate strength and brittleness, e.g. made of hard wheat semolina that is guided into the nails through boreholes or a slot and is thus fixed, for example adhered, onto each individual nail by appropriate means.

Strips of nails can also be composed of half-nails and connecting means, half-nails being ones which in terms of length only represent half a nail. In a first working step, as with the strips of subsequently connected individual nails, half-nails are aligned at right angles to the nail axis or in a step-like manner at an angle α and are connected to one another by one or more connecting means on the separating surface to the complementary half-nail, the connecting means being fixed to each individual half-nail. The complementary half-nails are then attached with accurate fit to the half-nails presented in a step-like manner and are fixed to the latter and to the connecting means to form complete nails connected to one another.

Another possibility for producing strips of nails is compression moulding shavings to form nails that are connected to one another by connecting means. In this connection a mass that can be shaped by moulding pressure, composed for example of wood shavings, bamboo shavings or generally woody plant substances that are surrounded by duroplastic or thermoplastic resins, are introduced into a tool that consists of a lower tool half and one or more upper tool halves. In the closed state the upper and lower tool halves envelop a cavity that corresponds to the geometric arrangement and to the volume of a strip of nails that is to be produced. The amount of mouldable mass that is to be used is such that in a first working step only all of the lower halves of the row of nails formed in steps are made. Connecting means, such as e.g. strips of paper, are placed onto the half-nails transversely to the longitudinal orientation of the nails in recesses provided for this purpose. In a second working step additional mouldable mass is added and is pressed with an upper tool half to form the complete nail geometry. The pressing can take place with cold-setting resins at room temperature. With hot-setting resins or with thermoplastic resins the tool halves are heated to the required temperature and then cooled back to room temperature for demoulding.

When producing strips of nails by compression moulding one can also dispense with separate connecting means if the cavities of the tools have connecting bridges between the nail cavities which, when pressing the mouldable mass or components of the mouldable mass, such as e.g. binder resin, are filled.

Another possibility for producing strips of nails is the punch compression moulding of compressible solid wood or of mats of mouldable mass com-posed of shavings and binding agents. The tool required for this purpose consists of an upper and a lower half that have grooves orientated in parallel and spaced apart from one another and the cross-section of which is in the form of half-bars. Solid wood with a rectangular cross-section, solid wood that has grooves at the locations for the subsequent connecting elements or a mat of mouldable mass composed of shavings and binding agents is compressed and moulded at a high pressure (>10 N/mm$^2$), optionally with heat (>100° C.), and if this has not taken place previously, it is then heated after the compression and subsequently cooled, as is known from WO9420273 A. The shaping of the strips of nails consisting of nails connected with bridges can be performed by punches within the same tool, the recesses required for this purpose then being widened, or in a separate tool. Depending on the rigidity of the connecting means between the nails, the strips of nails are rigid in their own right so that the whole strip of nails is raised if a nail at the end of a strip of nails lying on a lower layer is raised, or the strips of nails are flexible and can e.g. be rolled up into a roll. With flexible connecting means it is not the whole strip of nails lying on a lower layer that is raised, but only the adjacent nails located in the immediate vicinity of the raised nail.

Tests

1. Slats 70 cm long, 57 mm wide and 4.5 mm thick were produced from Santos rosewood (*Machaerium scleroxylon*) with a density of 0.95 g/cm3. The slats were then milled using a double-sided slot cutter into round bars with a diameter of 3.8 mm. The bars were cut to lengths of 50 mm and sharpened to a round tip at one side, the sharpening taking place with a pencil sharpener or alternatively with sand paper. The nail thus produced was inserted into a pneumatic nail gun and fixed by means of a small adhesive strip so that the nail head lay directly against the firing pin of the nail driver. The nail was driven into spruce wood by the pneumatic nail gun at 6 bar pressure and was thus sunk fully into the wood. After cutting open the nailed sample on a band saw, the nail being cut open in the longitudinal axis, it was established that the nail had retained its form and had not shattered. The contact surface between the nail and the surrounding spruce wood showed dark discolouration, which allows one to conclude that there was a thermal change to the wood caused by frictional heat. Upon heating the wood to temperatures that lead to discolouration (>100° C.), lignin is softened, and so the prerequisite for welding the two contact surfaces is established.

2. Two layers of peeled veneer made of beechwood, 3.7 mm thick, were glued together and pressed in a heating press for over 300 secs at 200° C. to a thickness of 4.6 mm. After pressing the density was 0.99 g/cm$^3$. As in Test 1, wooden nails were produced from this material and were driven into spruce wood. The result corresponds to Test 1.

3. Five layers of peeled veneer made of pine wood, 1.5 mm thick, were glued together and pressed in a heating press for over 300 secs at 200° C. to a thickness of 4.6 mm. The density was 0.82 g/cm$^3$. As in Test 1, wooden nails were produced from this material and were driven into spruce wood. The result corresponds to Test 1.

Figure 1:
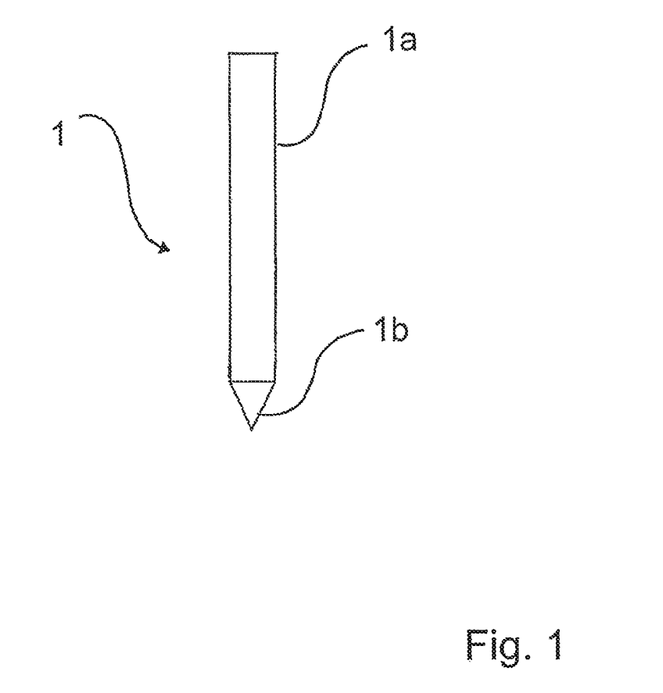
FIG. 1 a front view of a nail of a strip of nails according to the present invention, FIG. 2a a front view of a strip of nails according to the present invention, FIG. 2b a top view of the strip of nails from FIG. 2a, FIG. 3 a diagrammatic representation of a press for producing a strip of nails with four nails in the open state, FIG. 4 the press from FIG. 3 in the closed state, and FIG. 5 a diagram in which the results of a series of tests are summarised.

4. 57 mm wide and 4.5 mm thick strips of Santos rosewood and compressed beechwood (Test 2) were cut by laser cutting technology into square nails with an edge length of 4.5 mm, a length of 70 mm and a chisel tip, the length of which was 9 mm (see FIG. 1). The chisel tip was subsequently formed into a pyramidal tip by means of sand paper. The nails were tested as in Test 1, and the same result was obtained.

5. A commercial corrugated dowel made of beech, with a diameter of 6 mm and a length of 50 mm, was sharpened to a round tip and was able to be driven into spruce without shattering. The result corresponds to Test 1.

6. CoBAM was planed to a thickness of 4.5 mm and was cut by means of a circular saw into 4.5 mm wide strips that were cut to lengths of 70 mm and were sharpened on one side to form a pyramidal tip. The nails were able to be processed with the same result as in Tests 1 to 5.

7. Wooden nails made of *Machaerium scleroxylon*, which were produced according to tests 1 and 4, were tested for pull-out resistance. Round-milled nails with a diameter of 3.8 mm and laser-cut nails with a square cross-section with an edge length of 4.5 mm, both with a nail length of 60 mm, were driven into spruce wood by means of a pneumatic nail gun. Both types of nail were processed, either as described or additionally provided with a coating. The coating was a polymer coating containing filling material according to EP2540781. The pull-out values are shown in Table 1.

TABLE 1

Pull-out values of wooden nails driven into spruce wood (from Machaerium scleroxylon) with round and square cross-sections, with and without a polymer coating containing filling material.

|  | Pull-out force [kp] |
| --- | --- |
| Round bar nail without coating | 85.4 |
| Round bar nail with coating | 100.8 |
| Square bar nail without coating | 118.7 |
| Square bar nail with coating | 94.2 |
| Reference nail - metal | 92.0 |

Figure 2A:
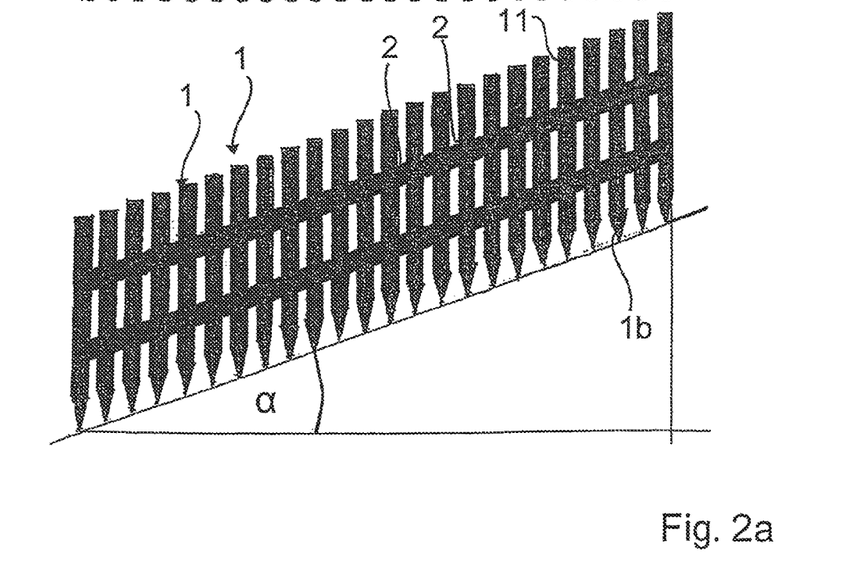
Figure 2B:
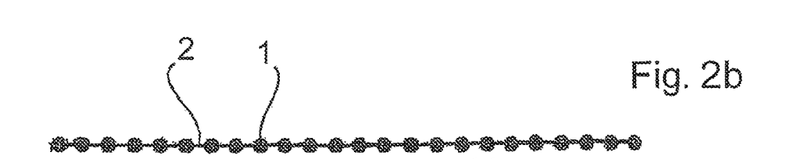

8. 4.5 mm thick corrugated boards corrugated on both sides, consisting of 24 parallel half-bars and 23 connecting bridges with a thickness of 1 mm were produced from solid material (Santos rosewood, synthetic resin compressed wood) by milling. The corrugated boards were cut by a circular saw at an angle of 160° into 60 mm long strips (the length relating to the axial orientation of the corrugations). On one side the corrugated board strips were sharpened on a belt grinder to form a chisel tip. Recesses were made in the connecting elements by means of a drill, a jig-saw and a band saw (see FIG. 2). The nail heads were formed by cuts arranged perpendicular to the corrugation axis. The tips were formed into pyramidal tips at the same angle as the chisel tips have by cuts offset by 90° to the chisel tip. The strips of nails were placed in a magazine holder of a pneumatic nail gun. Nails were driven individually into spruce wood by the pneumatic nail gun. The nail result corresponds to Test 1.

9. Commercially available corrugated boards made of CoBAM with corrugation on one side made of semi-circular bars with a diameter of 5 mm were separated on a saw so that half-bars with a 4.5 mm wide base were produced. The half-bars were cut to lengths of 60 mm. Two half-bars respectively were together sharpened on one side and were distributed in sequence over two templates that specify a parallel and step-like arrangement with a gradient angle α 20°. A host of semi-nails in a template was coated with glue. Two strips of paper were placed transversely over the host of semi-nails as connecting means. The upper sides of the paper strips were each coated with glue at the level of the semi-nails. The second host of semi-nails, each aligned to the other semi-nail, with which each semi-nail had been sharpened, was placed over the first host of semi-nails and fixed by means of the second template. The two templates were pressed together under pressure, the half-nails being glued to form complete nails connected with connecting strips. After the glue had hardened, the strip of nails was removed from the templates and tested as in Test 8, the same result being shown.

10. In order to determine the swelling pressure, test specimens made of wood with dimensions of 10×10×10 mm were compressed at 210° C. for 4 minutes at a pressure of 20 N/mm² in a press in the radial orientation of the growth rings. Spruce was compressed to 3.15 mm, pine to 36.7 mm and beech to 4.58 mm, and in each case this corresponds to a density of approx. 1.4 g/cm³. The compressed samples were clamped into a pressure measuring device and exposed to approx. 100% saturated air humidity. The kiln-dried samples absorbed humidity and thereby established within 30 hours a swelling pressure that was 8.4 N/mm² for spruce, 10.7 for pine and 8.2 N/mm² for beech.

BRIEF DESCRIPTION OF THE DRAWINGS

In the following an exemplary embodiment of the present invention is de-scribed with reference to the attached drawings. These show as follows.

DETAILED DESCRIPTION OF THE PREFERRED EMBODIMENT(S)

FIG. 1 diagrammatically represents a nail for a strip of nails according to the present invention. The nail 1 has a nail shaft 1a, the lower end of which is in the form of a nail tip 1b with a circular cross-section, i.e. with a conical round tip. At the upper end region the nail shaft 1a is cut off perpendicular to the longitudinal axis of the nail. Alternatively, a nail head can also be provided at the upper end which is then preferably in the form of a half-lens-shaped cap.

FIGS. 2a and 2b show a strip of nails according to the present invention. This consists of a plurality of nails arranged in parallel according to FIG. 1 and which are connected to one another by connecting means, here in the form of connecting bridges 2. The connecting bridges are designed such that they are automatically severed when a nail is shot out of the nail driver. In the embodiment shown the tips of the nails arranged in parallel lie on a straight line which is inclined with respect to the horizontal plane by an angle α, i.e. inclined with respect to the longitudinal axes of the nails by an angle 90° mi-nus α. Alternatively however, the nails can also lie on a straight line that is aligned at right angles to the longitudinal axis of the nail.

Figure 3:
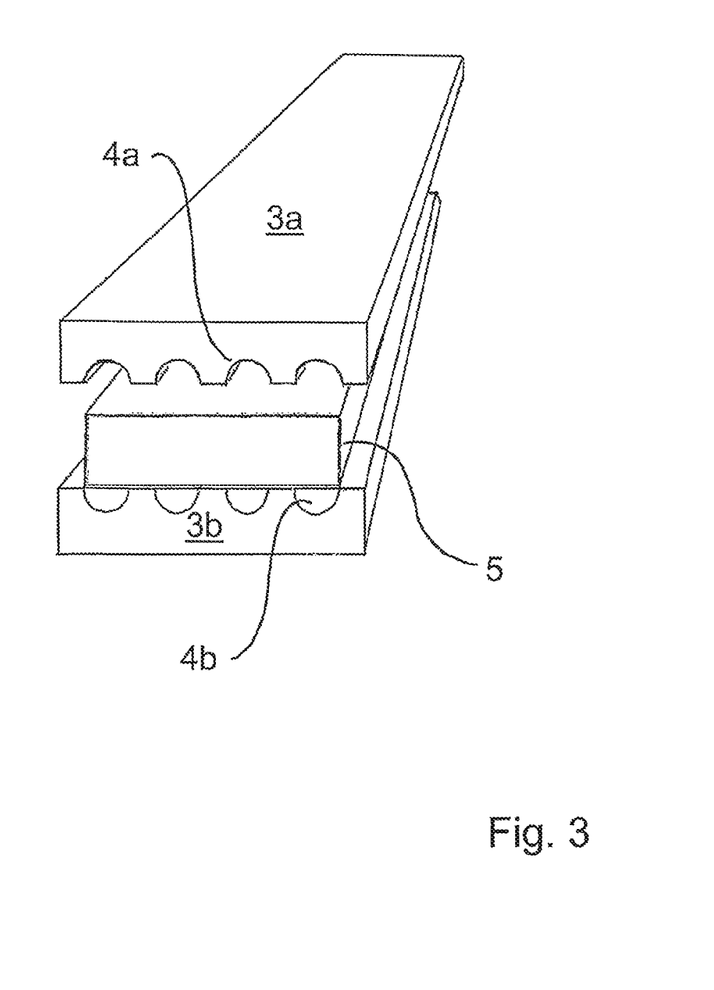
Figure 4:
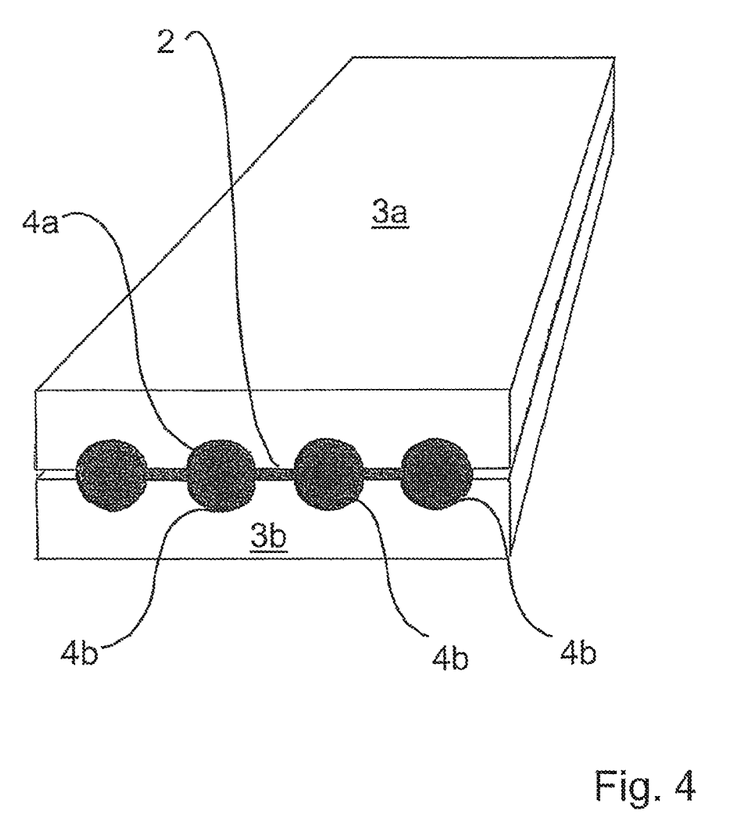

This type of strip of nails with a plurality of nails aligned in parallel, and which are connected to one another by connecting bridges 2, can be produced by punching compression moulding from compressed solid wood or a mat of mouldable mass composed of shavings and binding agents. The pressing tool required for this purpose consists, as can be seen from FIGS. 3 and 4, of an upper tool half 3a and a lower tool half 3b that have grooves 4a, 4b orientated in parallel and spaced apart from one another, and the cross-section of which is in the form of half-bars. A solid wood 5 with a rectangular cross-section, solid wood that is grooved at the locations of the subsequent connecting elements, or a mat of mouldable mass composed of shavings and binding agents, is compressed at high pressure and optionally with heat by bringing together the upper and the lower tool halves 3a, 3b so that the arrangement shown in FIG. 4 with four nails here that are connected to one another by a total of three connecting bridges 2 is obtained.

The invention claimed is:

1. A strip of nails for a nail driver that has a number of nails (1) connected to one another for connecting at least two components and which each have a nail shaft (1a) and a nail tip (1b) provided on the end of the latter, wherein the nails (1) are made of wood and/or wooden materials and/or bamboo or materials containing palm tissue with a density greater than 0.65 g/cm3 and are connected to severable connecting means (2) which are automatically sheared off when a nail is driven in, that the nail tip (1b) is made in the form of a conical round tip, and that the ratio of the length of the tip of the nail (1b) to the smallest thickness of the nail shaft (1a) is between 1.5 and 3.

2. The strip of nails according to claim 1, wherein the material from which the nails (1) are made has a density greater than 0.85 g/cm$^3$.

3. The strip of nails according to claim 1, wherein the nails (1) of the strip of nails are made of compressed material and develop a swelling pressure of 0.5 N/mm$^2$.

4. The strip of nails according to claim 1, wherein the humidity of the nails (1) of the strip of nails is less than the humidity of the components into which the nails (1) are to be driven than the humidity of the components.

5. The strip of nails according to claim 1, wherein the nails (1) have the same weathering behaviour as the components to be connected.

6. The strip of nails according to claim 1, wherein the nails (1) are made of a material such that they do not produce discolouration in the components.

7. The strip of nails according to claim 1, wherein the nails (1) are electromagnetically compatible.

8. The strip of nails according to claim 1, wherein the nails (1) have a pull-out resistance of at least 80 kp (1 kilopond [kp] corresponds to 9.8 Newton [N]).

9. The strip of nails according to claim 1, wherein the nails (1) are coated at least partially with a polymer layer that contains a filling material and have a pull-out resistance of at least 90 kp.

10. The strip of nails according to claim 1, wherein the nails (1) and connecting means 2) are made of the same material.

11. The strip of nails according to claim 1, wherein the nails (1) and connecting means (2) are made of different materials.

12. The strip of nails according to claim 11, wherein the connecting means (2) are made in the form of one or more shearable strips or threads, in particular made of paper, plastic film or plastic fusible strips which lie transversely over the individual nails (1) and bridge the spaces between the nails (1).

13. The strip of nails according to claim 12, wherein the strips or threads are fastened to each individual nail (1) e.g. by adhesive or by fusing, or that the connecting means (2), e.g. made of hard wheat semolina, are guided through bore holes or slots in the nails (1) and are fixed therein.

14. The strip of nails according to claim 1, wherein the nail shafts (1a) have a round or oval cross-section.

15. The strip of nails according to claim 1, wherein the nail shafts (1a) have a polygonal cross-section.

16. The strip of nails according to claim 15, wherein the ratio of the axial length to the smallest shaft thickness is between 4 and 25.

17. The strip of nails according to claim 14, wherein the diameter or the smallest shaft thickness of the nails (1) is in the range of 2 mm to 6 mm.

18. The strip of nails according to claim 1, wherein the nails on the end region of the nail shaft (1a) lying opposite the nail tip (1b) have a nail head that is made in the form of a half-lens-shaped cap, the nail head projecting radially over the nail shaft (1a) in relation to the shaft axis.

19. The strip of nails according to claim 1, wherein the nail shafts (1a) are truncated at an angle of 90° in relation to the shaft axis at their end region lying opposite the nail tip (1b).

20. A method of producing a strip of nails for a nail driver according to claim 1, wherein the nails (1) are made by machining tools by punching, cutting by means of electromagnetic waves, or by jet cutting, or by a combination of these methods.

21. The method of producing a strip of nails for a nail driver according to claim 20, wherein the strips of nails are produced by compression moulding a mouldable mass composed of wood and/or wood materials that is surrounded by duroplastic or thermoplastic resins.

22. The method of producing a strip of nails for a nail driver according to claim 20, wherein separately produced nails (1) are subsequently connected to the severable connecting means.

23. A method of connecting at least two components made of wood, wherein the components are connected to one another using a strip of nails according to claim 1 and a nail driver, and the individual nails (1) are driven by the nail driver into the components to be connected in a single go at a speed of at least 20 m/s.

* * * * *